United States Patent
Hallberg

(10) Patent No.: US 6,417,867 B1
(45) Date of Patent: Jul. 9, 2002

(54) IMAGE DOWNSCALING USING PERIPHERAL VISION AREA LOCALIZATION

(75) Inventor: Bryan Severt Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/321,519

(22) Filed: May 27, 1999

(51) Int. Cl.[7] ................................................. G09G 5/00
(52) U.S. Cl. ...................................... 345/660; 345/667
(58) Field of Search ................................ 345/113, 114, 345/127, 435, 173, 132, 433, 660, 667, 671, 606, 548, 670; 395/326; 358/537; 382/232; 707/530

(56) References Cited

U.S. PATENT DOCUMENTS

| | | | |
|---|---|---|---|
| 4,381,547 A | 4/1983 | Ejiri | 382/47 |
| 4,546,349 A | 10/1985 | Prohofsky et al. | 340/731 |
| 4,809,345 A | 2/1989 | Tabata et al. | 382/47 |
| 4,829,370 A * | 5/1989 | Mayne et al. | 358/537 |
| 4,872,064 A | 10/1989 | Tutt et al. | 358/464 |
| 5,196,934 A | 3/1993 | Fleischman et al. | 358/160 |
| 5,237,432 A | 8/1993 | Calarco et al. | 358/451 |
| 5,272,469 A * | 12/1993 | Memarzadeh | 345/173 |
| 5,283,557 A * | 2/1994 | Memarzadeh | 345/132 |
| 5,335,295 A | 8/1994 | Ferracini et al. | 382/47 |
| 5,528,740 A * | 6/1996 | Hill et al. | 395/128 |
| 5,638,523 A * | 6/1997 | Mullet et al. | 395/326 |
| 5,689,287 A * | 11/1997 | Mackinlay et al. | 345/427 |
| 5,838,297 A | 11/1998 | Zhao | 345/127 |
| 6,028,608 A * | 2/2000 | Jenkins | 345/433 |
| 6,101,514 A * | 8/2000 | Chan | 707/530 |
| 6,252,989 B1 * | 6/2001 | Geisler et al. | 382/232 |

* cited by examiner

*Primary Examiner*—Chanh Nguyen
*Assistant Examiner*—Fritz Alphonse
(74) *Attorney, Agent, or Firm*—Marger Johnson & McCollom, PC

(57) ABSTRACT

Methods and apparatus for representing a digital image on a display having a lower resolution than the image are disclosed. In one embodiment, a display driver maps an original bitmap onto display coordinates using two regions. The first region is a viewer's current area of interest on the display (e.g., determined by active cursor or pointer position, or by an eye tracker). This region of the original bitmap is mapped onto the display at full resolution. The remainder of the bitmap is downsampled to fit the display, and displayed on the remainder of the display. The first region is registered to the second region, such that as the viewer focuses on a new area of the display, the first region "moves" to align with the underlying downsampled image. The invention thus provides an intuitive and easy-to-use interface for viewing images on a limited-resolution display.

29 Claims, 12 Drawing Sheets

IMAGE DOWNSCALING USING PERIPHERAL VISION AREA LOCALIZATION

FIELD OF THE INVENTION

This present invention relates to digital image display, and more particularly to a method and apparatus for displaying a digital image on a display having a lower resolution than the image.

BACKGROUND OF THE INVENTION

Digital images are often created or stored at high resolution. Many display devices, such as cathode ray tubes (CRTs) and liquid crystal displays (LCDs), may be unable to display an entire large, high resolution image all at once. For example, a scanned image several thousand pixels wide cannot be shown, without some manipulation, on an 800× 600 pixel display device. Another example is a computer that generates a high resolution bitmap, based on running graphical applications, for output on a remote display that has a lower resolution.

Many methods have been devised for dealing with this problem. One common approach is to downscale the resolution of an image by a factor that allows the entire image to fit a lower-resolution display. This approach throws away information, often making the image difficult or impossible to comprehend, particularly if the image has graphical content like text.

A second approach is to display the original image data at the original resolution, however only displaying a subsection of the image at any one time. The entire image is not viewable at once with this method—in order to view obscured portions, a user must manipulate a scrolling function to change the viewable portion of the image. This method typically employs "scroll bars", which further decrease the viewable area of the image.

Yet another method allows the user to manipulate a "zoom" function, alternating between a blurry view of the entire image and a legible view of a desired image subsection.

Finally, a fourth method uses two display windows. A first window displays a downscaled view of the entire image, and a second, non-overlapping window displays a subsection of the image at higher resolution. In order to use this method, a user must alternate their gaze between the first window, for selecting an area for display in the second window, and the second window, for discerning content. In addition to making viewing difficult, this method often results in the least efficient use of display space.

SUMMARY OF THE INVENTION

The present invention takes a different approach to displaying high-resolution image data on a low-resolution device. The present invention displays a subsection of the image data at its original resolution on one region of the display, but overlays this display on a larger, low-resolution display of the image data. The first region is registered to the second region, such that as the viewer focuses on a new area of the display, the first region "moves" to align with the underlying downsampled image. The invention thus provides an intuitive and easy-to-use interface for viewing images on a limited-resolution display.

Thus in a first aspect of the invention, a method for displaying a digital image to a viewer is disclosed. Using an indication from the viewer of a desired point of interest on a downsampled version of an original image shown on a display (e.g., determined by active cursor or pointer position, or by an eye tracker), a point on the original digital image that is substantially registered with the point of interest is calculated. A subsection of the original digital image that includes this substantially registered point is mapped onto the display so as to overly the point of interest. Preferably, the subsection and the downsampled version are substantially registered at the point of interest.

In a second aspect of the invention, a display driver is disclosed. This driver includes a subimage extractor for retrieving a subsection of an input bitmap, according to supplied coordinates. It also includes a downsampler for calculating a downsampled version of the input bitmap. A mixer mixes the subsection and downsampled version onto a common display region, the position of the subsection on the display region being determined based upon the supplied coordinates.

In yet another aspect of the invention, a display system is disclosed. The system comprises a display device having a first resolution, and a video RAM memory having a size sufficient to store a bitmap larger than the first resolution. The system further comprises a display driver having a display mode for displaying a bitmap stored in the video RAM memory, where the bitmap is larger than the display resolution. In this display mode, a subsection of the stored bitmap is displayed on a subsection of the display device, and a downsampled version of the stored bitmap is displayed on areas of the display device other than the first subsection. The subsection is substantially registered to the downsampled version at a point on the display device.

BRIEF DESCRIPTION OF THE DRAWING

The invention may be best understood by reading the disclosure with reference to the drawing, wherein.

DETAILED DESCRIPTION OF THE PREFERRED EMBODIMENTS

The preferred embodiments disclosed below were selected by way of illustration and not by way of limitation.

As used herein, a "display driver" formats digital image data for display. A "video adapter" is a display driver that produces output to a display device. It is recognized that the specific display driver and video adapter embodiments described herein are implementable, e.g., in hardware, a software-configured microprocessor, or some combination of these approaches.

Figure 1:
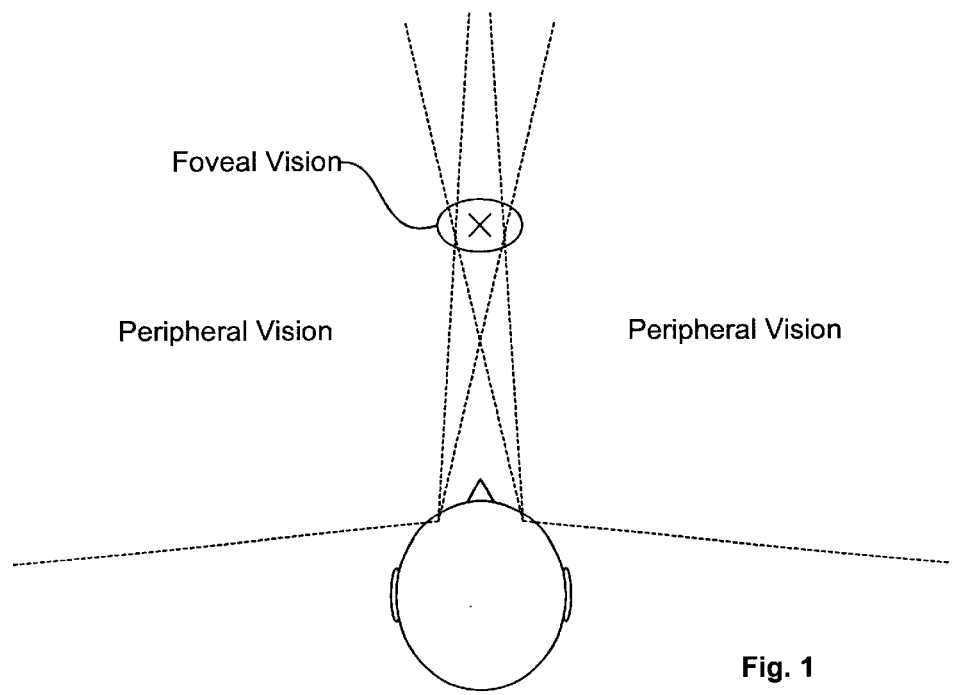
FIG. 1 illustrates the human field of vision.

By way of introduction, FIG. 1 illustrates, from a top-down perspective, the human field of vision. The fovea is the point of greatest concentration of cones in the retina of the human eye—thus a human will generally align their eyes so as to image an object onto the eye's fovea when they wish to discern fine detail of the object. Thus in FIG. 1, the subject has trained both eyes on the "X" by moving each eye such that the X images on the fovea of that eye.

The physiology of the human eye limits the area of foveal vision to only a few degrees in extent. Outside of this area, peripheral vision dominates. Peripheral vision is primarily used to detect motion, and is poor at discerning detail.

Figure 2:
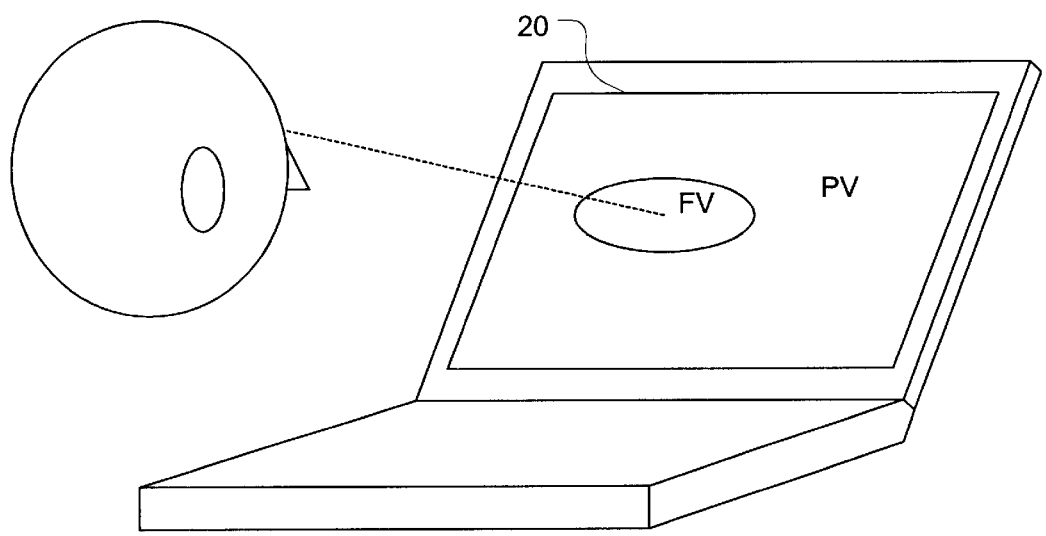
FIG. 2 illustrates the human field of vision, applied to a display device.

FIG. 2 illustrates the arrangement of a human viewing a display device 20 at a comfortable viewing distance. At such a distance, only a small region FV of the display screen falls within the foveal vision area. Areas outside of this region (labeled PV) are discerned with peripheral vision only. A typical computer screen displays the entire screen image with sufficient detail for foveal viewing, even though the viewer can only discern, at any instant, an area equal to FV with that amount of detail. This allows the viewer to peruse the entire screen at their leisure.

The present invention takes advantage of human physiology in order to display, on a display device 20, images that are too large at full resolution for display 20.

Figure 3A:
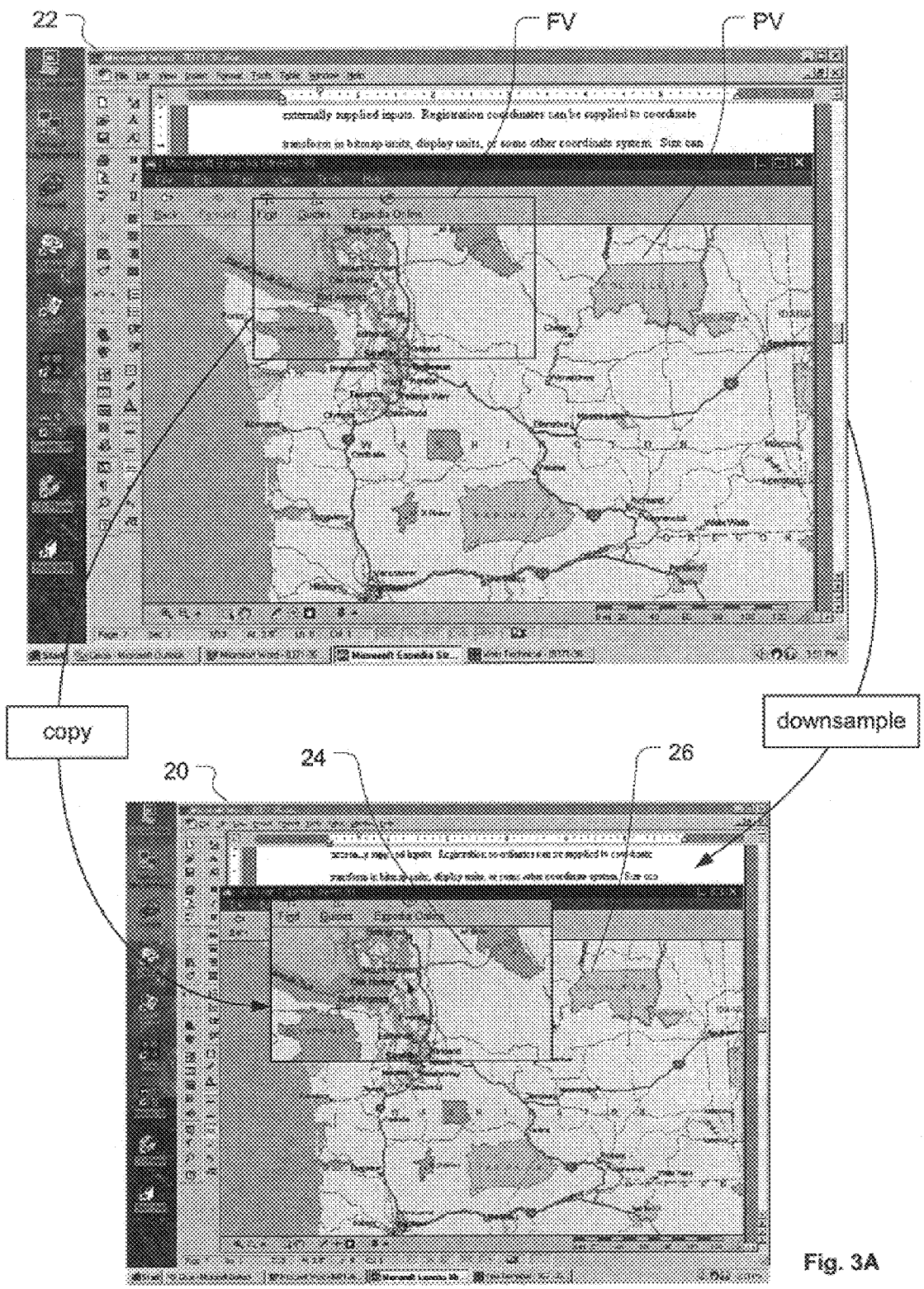
FIGS. 3A–3C and 4 illustrate image mapping onto a display, according to an embodiment of the invention.

FIG. 3A shows, for an actual screen bitmap 22, image mapping according to an embodiment of the invention. Display 20 is shown below image 22 at the same scale. Image 22 is larger than display 20, and consequently cannot be displayed in its entirety on display 20. But if a viewer can indicate a desired foveal view subimage FV, that region should be displayable in its entirety using only a portion of the area of display 20. This embodiment performs this function by "copying" a desired foveal view subimage, as indicated by a user, onto display 20 at full resolution, forming subimage 24. A further feature of this embodiment is that FV subimage 24 is positioned on display 20 in proportion to its location in image 22, i.e., if the midpoint of FV is 30% of the horizontal distance across image 22, FV subimage 24 is mapped with its midpoint 30% of the distance across display 20.

Because the rest of image 22 (peripheral region PV) lies outside of the foveal vision area, a faithful representation of PV is not required on display 20. Therefore, PV is downsampled onto the remainder of display 20, forming PV region 26. Preferably, the downsampling function shrinks the image just enough for it to fit on display 20 without cropping.

Figure 3B:
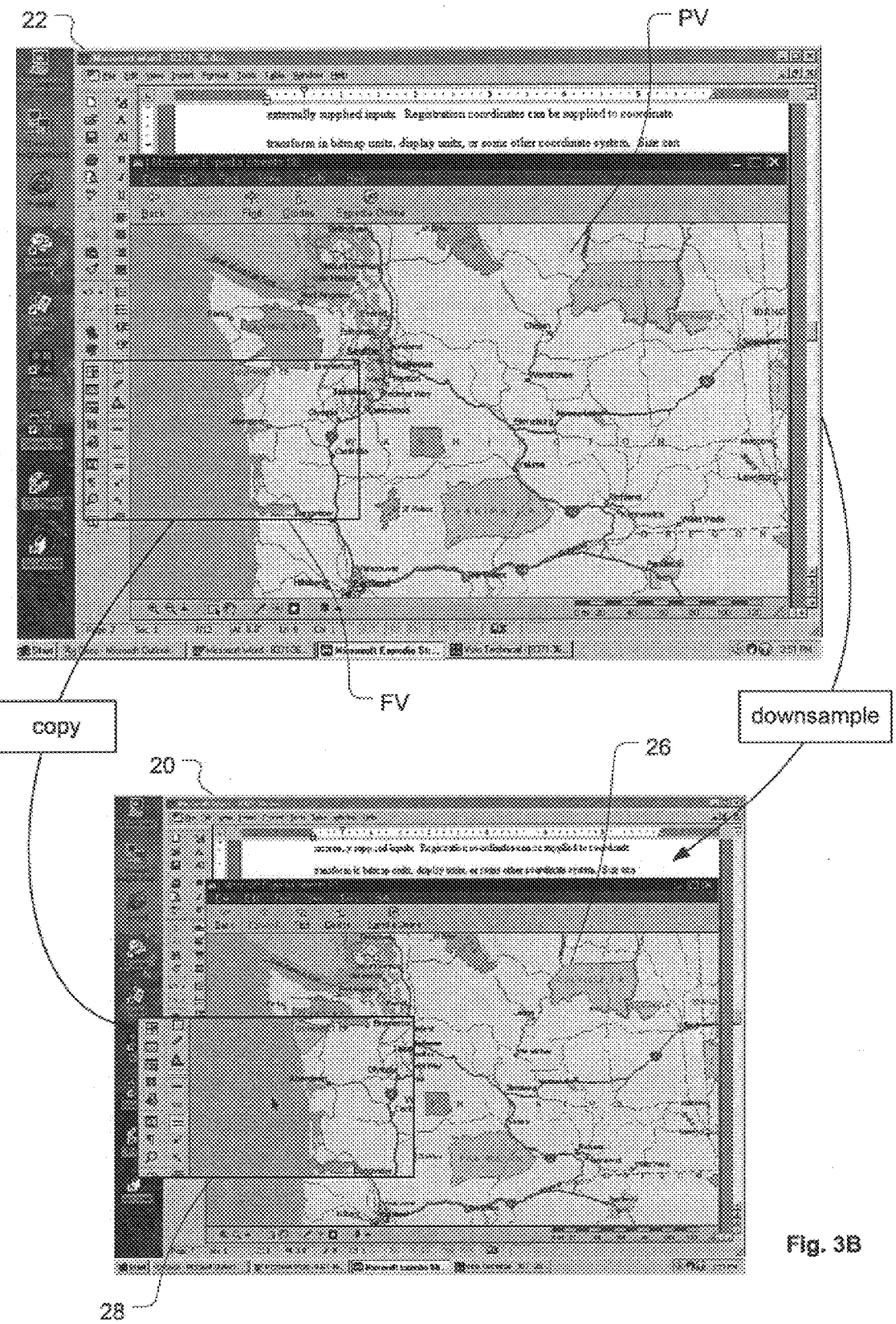

One benefit of the above mapping is its intuitiveness. Not only is FV mapped proportionally, but it is registered with PV region 26 at FV's center. Although the regions FV and PV are mapped onto the display at different scales, peripheral areas of the image are generally where the viewer looking at FV expects them to be, allowing the user to easily navigate the display. For instance, in FIG. 3B, the eye's focus has shifted towards the bottom right corner of display 20. The new foveal subsection 28 is mapped proportionally on display 20, such that it overlies PV region 26 at the mapped focal point represented by the cursor. Although PV and FV are displayed at different resolutions, they are substantially registered at the focal point. A viewer can view any point on the image at full resolution by merely focusing on the corresponding point in the smaller resolution peripheral vision image displayed on 20. The viewer need not activate scrolling or zooming functions, or otherwise divert their attention away from the area of interest in order to see that area at full resolution.

Figure 3C:
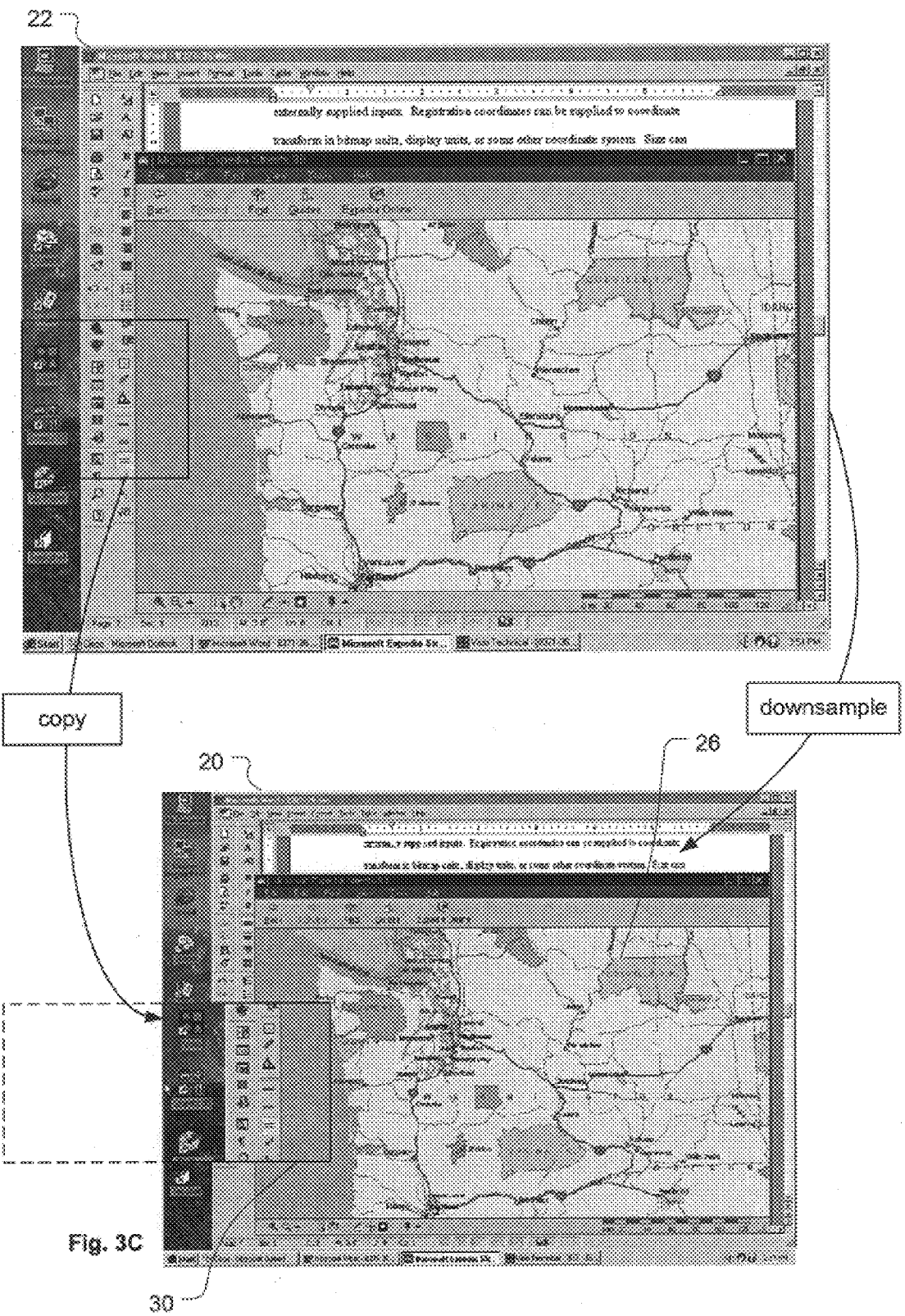

As a viewer continues to divert their gaze into the corner or towards the edge of an image, the foveal vision area will only partially overlap the display area. FIG. 3C shows one display mapping option for this case. The foveal vision area overlapping the display is mapped faithfully into region 30, and thus can shrink to occupy as little as 25% of its size at mid-display if the viewer looks completely into a corner of the display.

Figure 4:
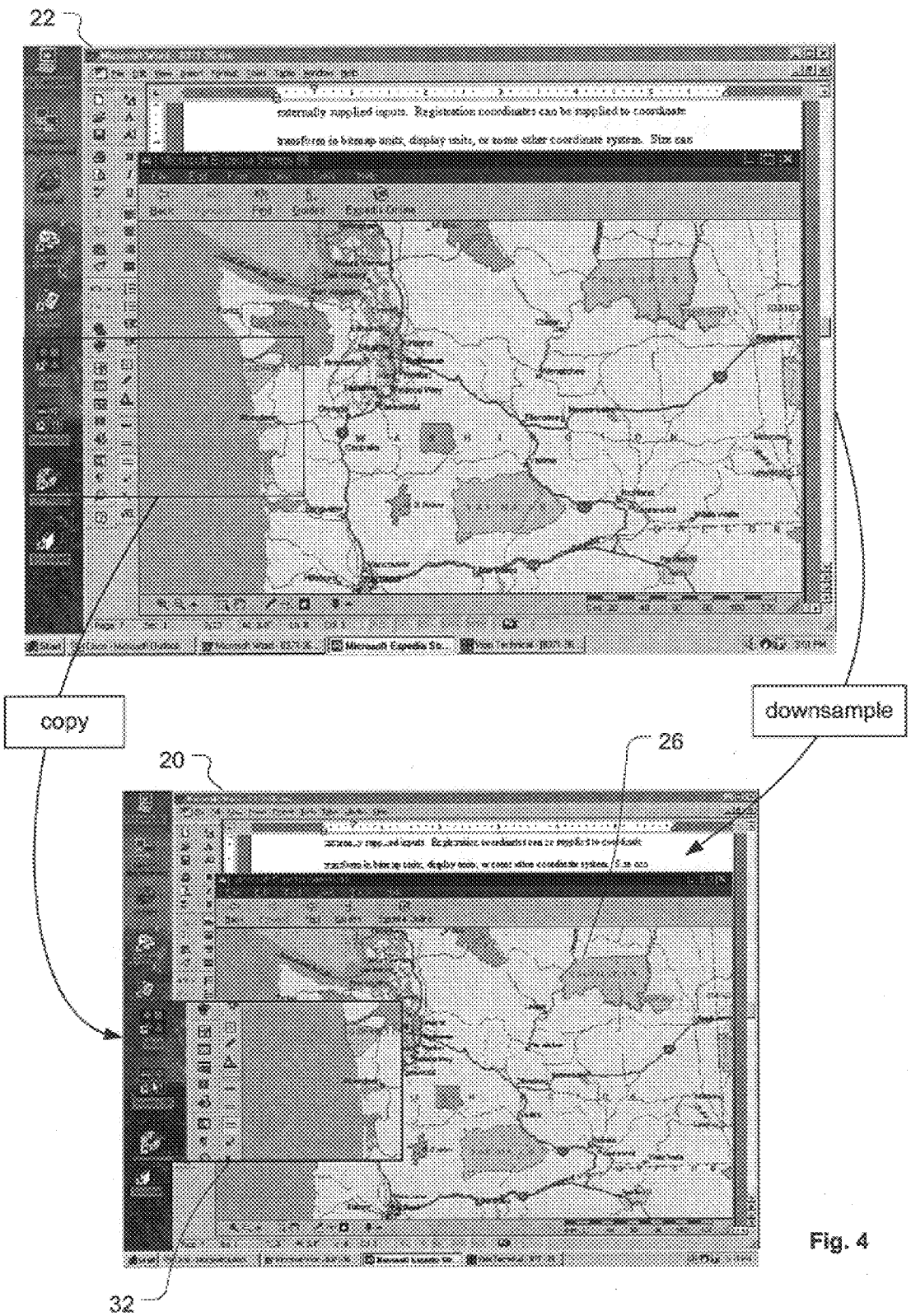

FIG. 4 illustrates a second mapping possibility for the corner/edge case. As the foveal vision area contacts the edge of the display area, it "sticks"—although the viewer may continue to look further towards the image edge, the foveal image area does not continue to move, although its content will continue to flow. Once the foveal vision area contacts the edge of image 22, it also "sticks". Since all edge pixels are already visible, no additional adjustment is made in region 32 if the viewer looks further into the corner (note the off-center cursor overlying the "Streets 98" icon and representing the viewer's focal point).

These embodiments seek to register the downscaled image and foveal vision area at or near the focal point. Exact registration may not exist, however. For instance, the exact row of focus in the foveal vision area may not exist in the peripheral vision area, having been downsampled away. In this case the foveal image area is registered at a neighboring area, e.g., by rounding up or down. Also, in the mode of FIG. 4, the point of registration may not continue to track the user's view near the image edges. In some embodiments, focal point hysteresis and/or temporal averaging of the focal point may be used to prevent the foveal subimage from jittering if the focal point is slightly unstable.

Figure 5A:
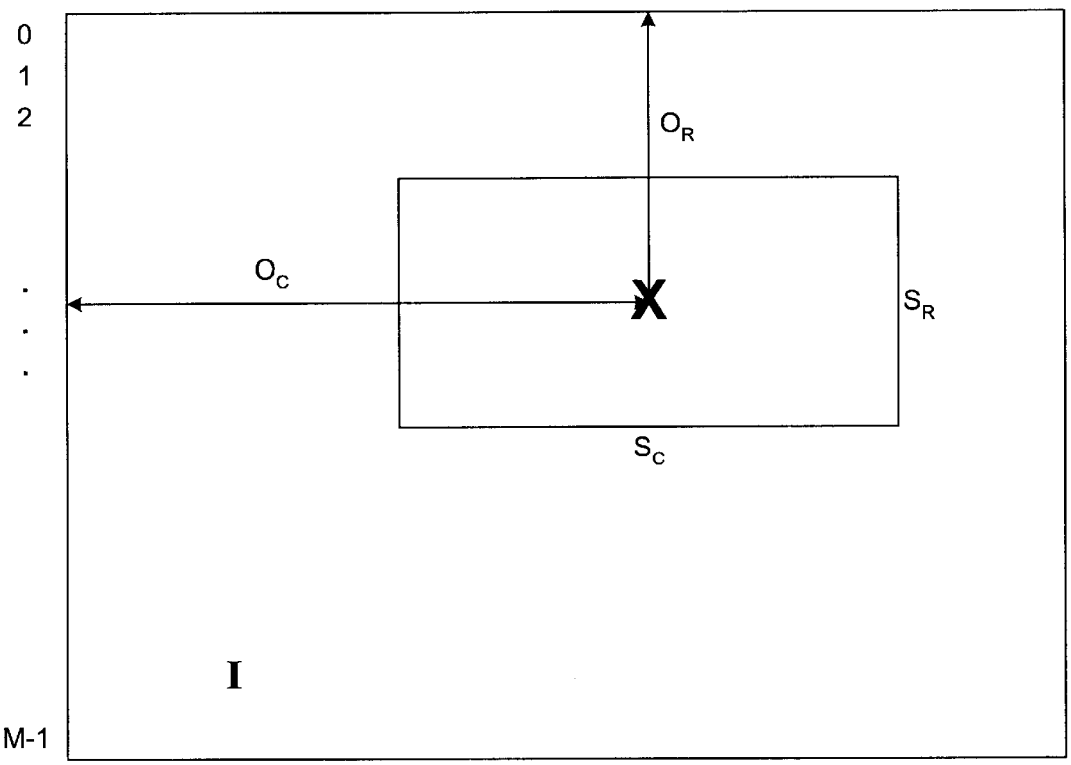
FIGS. 5A and 5B show several dimensions and coordinates in relationship to an image and a corresponding display area.
Figure 5B:
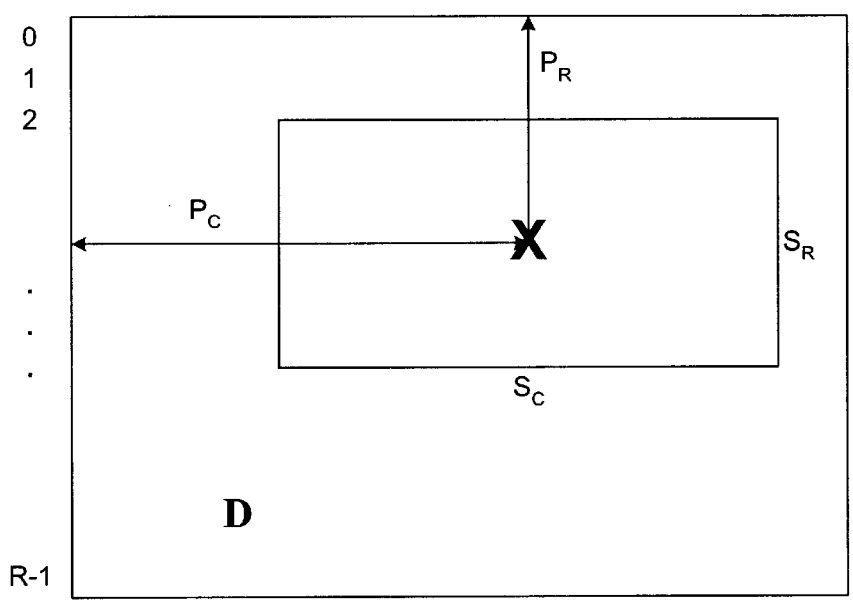

The mathematical transformations necessary to describe several embodiments of the invention are as follows. FIGS. 5A and 5B illustrate, respectively, an original image I and a display area D, with several dimensions useful in mapping according to the present invention overlaid. Image I has M rows, numbered top to bottom from 0 to M−1, and N columns, numbered left to right from 0 to N−1. Display area D has R rows, numbered top to bottom from 0 to R−1, and C columns, numbered left to right from 0 to C−1. The focal point X is located at coordinates $p_R$, $p_C$ in display D, and at coordinates $o_R$, $o_C$ in image I. In both views, the foveal vision area is $s_R$ rows high by $s_C$ columns wide.

Given these definitions, the scale factor for mapping image I onto display area D is C/N or R/M. Note that if the image and display do not have equal aspect ratios, the smaller scale factor of the two ratios can be chosen for both dimensions in order to fit the entire image onto the display while preserving aspect ratio. Points can be transformed between the two coordinate systems using the equations $$D(i,j) = I(m \times M/R, n \times N/C) \qquad (1)$$

and $$I(m,n) = D(i \times R/M, j \times C/N). \qquad (2)$$

Figure 6:
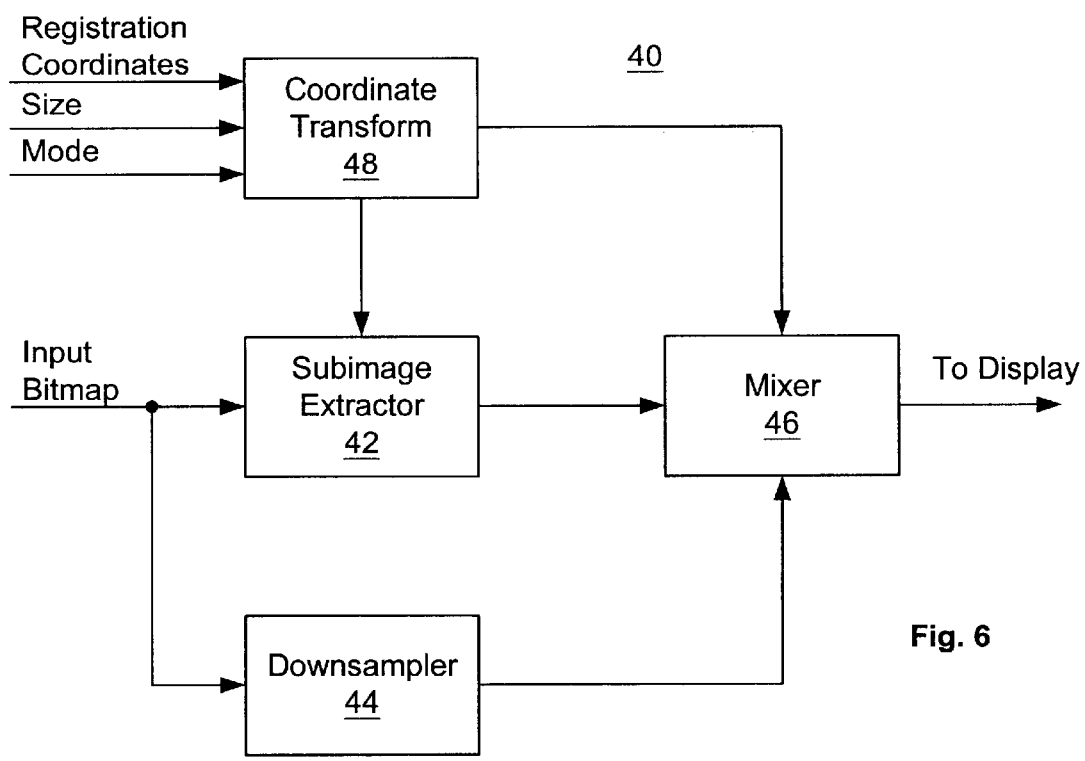
FIG. 6 depicts a block diagram for a display driver according to an embodiment of the invention.
Figure 7:
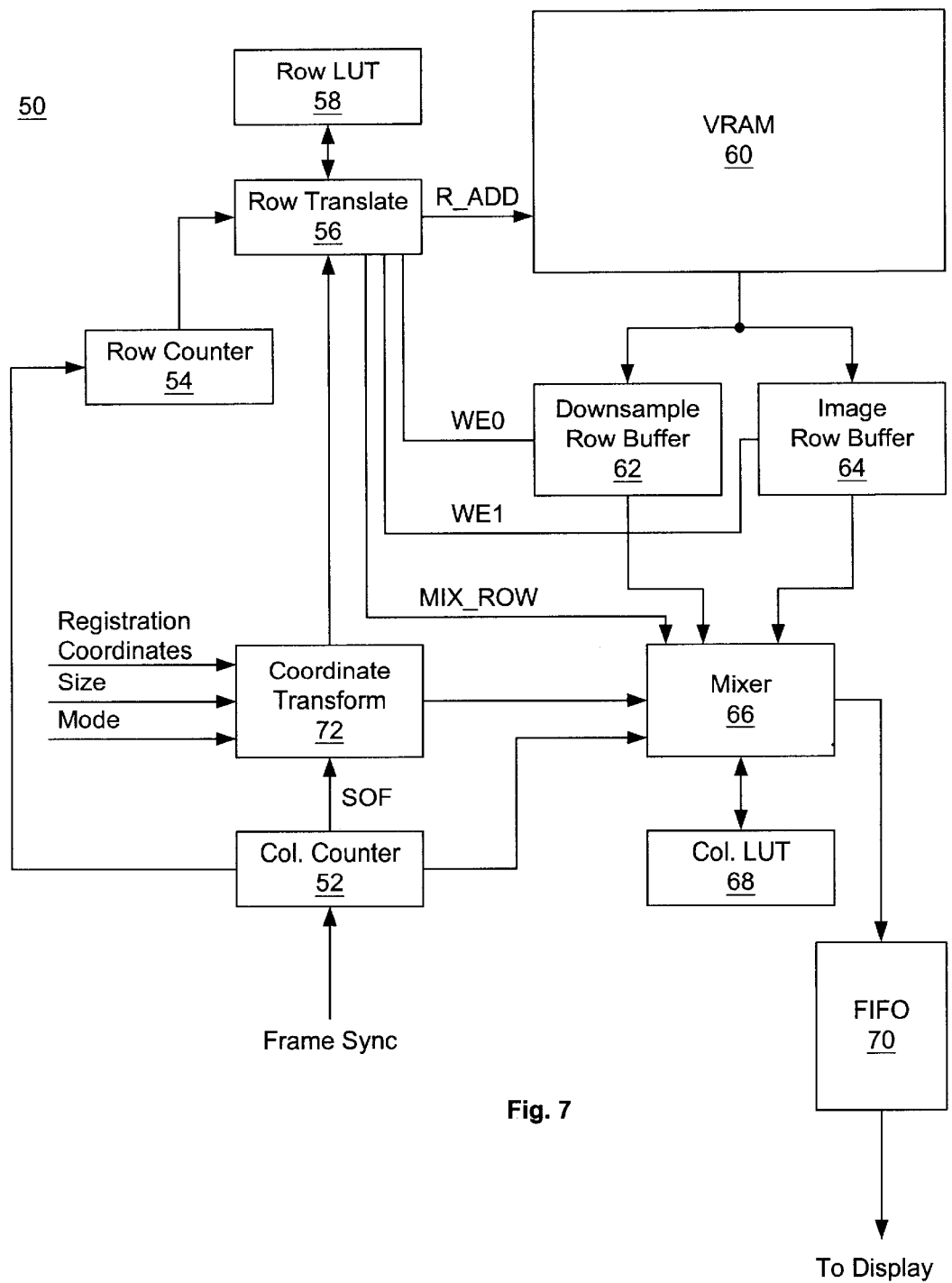
FIG. 7 depicts a block diagram of a video adapter according to an embodiment of the invention.

FIG. 6 shows a block diagram for a display driver 40 according to an embodiment of the invention. The driver can be embodied in software using a host device's processor, or in software or hardware on a specialized video adapter, such as is shown in FIG. 7. An input bitmap is supplied to a subimage extractor 42 and a downsampler 44. Subimage extractor 42 produces a subsection of the input bitmap, based on coordinates supplied by coordinate transform 48. Downsampler 44 produces a downsampled version of the input bitmap, based on the scale factor required to map the input bitmap to the display resolution. Downsampler 44 may employ any acceptable downsampling method, including interpolation methods and pixel deletion methods.

Mixer 46 accepts output from subimage extractor 42 and downsampler 44, and mixes these for output to a display. The mixer, using coordinates supplied by coordinate transform 48, outputs the downsampler output except within a defined foveal vision area, where the subimage extractor output is substituted.

Coordinate transform 48 supplies registration point and subimage size information, based on externally supplied inputs, to subimage extractor 42 and mixer 46. Registration coordinates can be supplied to coordinate transform 48 in bitmap units, display units, or some other coordinate system. Size can likewise be communicated explicitly, or information (such as the viewer's distance from the screen and/or preferences) can be used to compute a foveal vision area. A mode signal can be used to switch in and out of this mixing mode to another mode, or to change preferences such as hysteresis or edge behavior.

FIG. 7 shows one possible embodiment of a video adapter, video adapter 50, implementing the general functions of display driver 40. Video adapter 50 includes video random access memory (VRAM) 60, of a size large enough to hold the desired input bitmap. Although not shown, a processor or other device (generally not part of adapter 50) updates the input bitmap stored in VRAM 60 as required by the system utilizing the adapter to interface to an attached display. Although specific implementations of VRAM 60 may offer a variety of readout characteristics, in this example VRAM 60 offers a fast readout mode for reading a row of information at a time.

Column counter 52 and row counter 54 generate screen addresses in a predefined pattern. For example, in a left-to-right, top-to-bottom non-interlaced scan using the coordinate system of FIG. 5B, both counters reset to 0 in response to a frame synchronization signal (preferably, this signal precedes the actual start-of-frame time, allowing sufficient time for video adapter 50 to fill its pipeline). Column counter 52 increments at a clock rate closely matched to the per-pixel scan rate needed to support the display mode. When counter 52 counts up to the number of columns in the display, it wraps to 0 and signals row counter 54. Row counter 54 increments in response to this signal.

Coordinate transform 72 operates according to the description of transform 48 (see FIG. 6) above. Preferably, transform 72 responds to a start-of-frame signal SOF from column counter 52, such that coordinates are updated at the start of each frame.

The subimage extractor and downsampler of FIG. 6 are implemented in FIG. 7 using several distributed components, including row translate unit 56, look-up tables (LUTs) 58 and 68, and buffers 62 and 64.

Row translate unit 56 determines which data rows of VRAM 60 are needed to create the display row reported out by row counter 54. For each new display row, row translate 56 determines whether only downsampled pixels are needed, or whether subimage pixels are needed as well. In either case, row translate unit 56 transmits a first row address R_ADD to VRAM 60. This address corresponds to the original bitmap row that will be downsampled to create the current display row's peripheral vision region pixels. Row translate unit 56 also asserts the write enable signal WE0, signaling downsample row buffer 62 to accept a row of bitmap data from VRAM 60.

When subimage pixels are also needed to create the current display row, row translate unit 56 transmits a second row address R_ADD to VRAM 60. This address corresponds to the original bitmap row that will be partially copied into the current display row. Row translate unit 56 also asserts the write enable signal WE1, signaling image row buffer 64 to accept a row of bitmap data from VRAM 60.

Row translate unit 56 transmits the display row MIX_ROW to mixer 66, signaling mixer 66 that data for that row is available for mixing. Mixer 66 steps through the display columns, outputting a bitmap value to FIFO 70 for each column. When the current display row should contain only downsampled data, mixer 66 receives all of its bitmap values from downsample row buffer 62. When subimage data occupies a portion of the current display row, mixer 66 selects bitmap values from image row buffer 64 when appropriate.

LUTs 58 and 68 aid row translate unit 56 and mixer 66 by mapping a downsampling-by-decimation function. For instance, row LUT 58 contains a one-dimensional array of integer row addresses, one array element for each display row. Array element 0 contains the row address for the original bitmap row that maps to display row 0, array element 1 contains the row address for the original bitmap row that maps to display row 1, and so on. The array may be initialized, e.g., using equation 1. After initialization, row translate 56 can determine which original bitmap row will be needed for downsampling by reading the ith element of row LUT 58, where i is the current display row. Column LUT 68 operates similarly to aid mixer 66 in determining column mapping.

The following pseudocode further illustrates the operation of video adapter 50, although the code may also be used in other implementations, including a software-configured general purpose processor implementing an embodiment of the invention. The externally-supplied variables PointRow, PointCol describe the display focal point in display coordinates, and the externally-supplied variables SizeRow, SizeCol describe the size of the original-sized subimage.

```
/* at initialization of display driver, init LUTS */
for (i = 0; i < R; i++)
{
    RowLut [i] = i * M / R;
}
for (j = 0; j < C; j++)
{
    ColLut[j] = j * N / C;
}
/* for each display scan, initialize subimage coordinates */
StartRow  = PointRow  - SizeRow / 2;
EndRow    = StartRow  + SizeRow;
StartCol  = PointCol  - SizeCol / 2;
EndCol    = StartCol  + SizeCol;
OffRow    = PointRow  * M / R - PointRow;
OffCol    = PointCol  * N / C - PointCol;
/* then fill display image */
for (i = 0; i < R; i++)
{
    DownsampleBuf = OrgBitmap [RowLut [i]];
    /* case 1: only downsampled pixels in this row */
```

```
    if (i < StartRow || >= EndRow)
    {
        for (j = 0; j < C; j++)
        {
            Display[i][j] = DownsampleBuf[ColLut[j]];
        }
    }
    /* case 2: some copied subimage pixels in this row */
    else
    {
        ImageRowBuf = OrgBitmap[i + OffRow];
        for (j = 0; j < C; j++)
        {
            if (j < StartCol || j >= EndCol)
            {
                Display[i][j] = DownsampleBuf[ColLut[j]];
            }
            else
            {
                Display[i][j] = ImageRowBuf[j+OffCol]
            }
        }
    }
}
```

The pseudocode above produces a result similar to FIG. 3C at the image edges. If a result similar to FIG. 4 is desired instead, the starting and ending row and column variables may be adjusted to not exceed the display image boundaries.

It can be appreciated from the pseudocode above that downsampling-by decimation, combined with a rectangular foveal imaging area, leads to an implementation that is computationally simple. If processing power is available, other options may be chosen. For instance, the foveal imaging area can be made elliptical, or in some other desired shape. Or, the image can be downsampled using interpolation, low-pass filtering, or other known downsampling methods.

Figure 8:
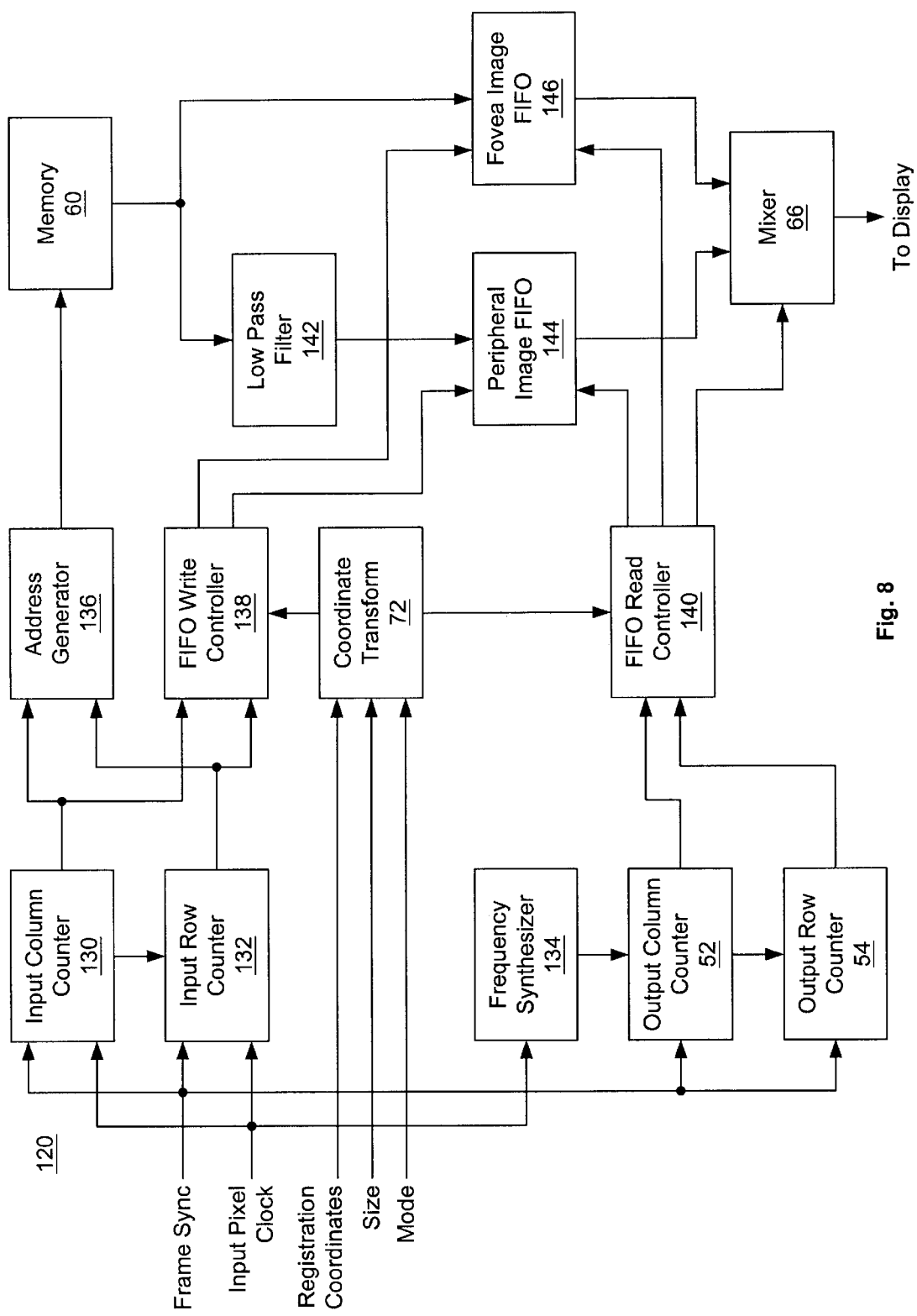
FIG. 8 depicts a block diagram of a video adapter according to a second embodiment of the invention.

FIG. 8 illustrates a block diagram of a video adapter 120 that performs low-pass filtering. Video adapter 120 includes a random access memory device 60, of a size large enough to hold the desired input bitmap, which may be updated as required by the system utilizing the adapter to interface to the attached display.

Input column counter 130 and input row counter 132 generate input image pixel addresses in a predefined pattern, for example, in a left-to-right, top-to-bottom non-interlaced scan using the coordinate system of FIG. 5A. Both counters reset to 0 in response to a frame synchronization signal. Input column counter 130 increments at the clock rate of the input pixel clock, whose frequency equals the frequency required to display the input image at the desired frame rate on a display whose resolution matches that of the input image. When counter 130 counts up to the number of columns in the input image, it wraps to 0 and signals input row counter 132. Input row counter 132 increments in response to this signal. Counter 130 may additionally count horizontal blanking columns or pause during the horizontal blanking interval. Counter 132 may additionally count vertical blanking rows or pause during the vertical blanking interval.

Frequency synthesizer 134 converts the input pixel clock into an output pixel clock. The output pixel clock frequency equals the frequency required to display the output image on the desired display at the desired frame rate.

Output column counter 52 and output row counter 54 generate output image pixel addresses in a predefined pattern, for example, in a left-to-right, top-to-bottom non-interlaced scan using the coordinate system of FIG. 5B. Both counters reset to 0 in response to a frame synchronization signal. Output column counter 52 increments at the clock rate of the output pixel clock. When counter 52 counts up to the number of columns in the output image, it wraps to 0 and signals output row counter 54. Output row counter 54 increments in response to this signal. Counter 52 may additionally count horizontal blanking columns or pause during the horizontal blanking interval. Counter 54 may additionally count vertical blanking rows or pause during the vertical blanking interval.

Coordinate transform 72 operates according to the description of transform 48 (see FIG. 6) above. Preferably, transform 72 responds to the frame synchronization signal, such that coordinates are updated at the start of each frame.

The subimage extractor and downsampler of FIG. 6 are implemented in FIG. 8 using several distributed components, including address generator 136, FIFO write controller 138, FIFO read controller 140, low pass filter 142, peripheral image FIFO 144, and fovea image FIFO 146.

Address generator 136 determines which memory elements of memory 60 are read out for the input image column reported by input column counter 130 and the row reported by input row counter 132. As the data for each successive pixel is read from memory 60, it is sent to low pass filter 142 and fovea image FIFO 146.

Low pass filter 142 filters the entire image to the desired cutoff frequency using whatever implementation the designer desires.

The filtered image pixels required to create the peripheral image are detected with FIFO write controller 138. When input column counter 130 and input row counter 132 report an input image pixel located inside of the peripheral image area, controller 138 signals peripheral image FIFO 144 to store the pixel data.

The input image pixels required to create the subimage are also detected with FIFO write controller 138. When input column counter 130 and input row counter 132 report an input image pixel located inside of the fovea image area, controller 138 signals fovea image FIFO 146 to store the pixel data.

Output column counter 52 and output row counter 54 report the column and row of the output pixel being displayed. FIFO read controller 140 detects whether the displayed pixels is inside the peripheral image area or the fovea image area. When output column counter 52 and output row counter 54 report an output image pixel located inside of the peripheral image area, controller 140 signals peripheral image FIFO 144 to retrieve the pixel data. When output column counter 52 and output row counter 54 report an output image pixel located inside of the fovea image area, controller 140 signals fovea image FIFO 146 to retrieve the pixel data. Controller 140 similarly signals mixer 66 to display either the peripheral image FIFO's output pixel or the fovea image FIFO's output pixel.

Any desired filtering or warping, linear or non-linear, can be implemented using the basic structure described above by simply substituting the appropriate function into the low pass filter block 142. For the simplest application filter 142 could simply copy the input pixels to the output, performing no filtering at all. A more complex filter can be created by multiplying the input pixels by a coefficient matrix, such as a sinc function, to create each output pixel. Even more complex filters can be achieved by multiplying the input pixels by a dynamic matrix to create a warped output image. Given that filter 142 contains sufficient internal memory, the dynamic matrix can even be constructed such that the filter 142 outputs the fovea image in the fovea region, thus removing the need for FIFO 146 and mixer 66.

One artifact of the embodiments described above is a discontinuity in the display appearance at the boundary of the original-sized subimage and the downsampled region. This discontinuity actually "hides" part of the original image—this hidden part appears in neither the original-sized subimage nor the downsampled region. Other embodiments will now be described that remove this discontinuity, such that every region of the image is represented somewhere. The main disadvantage of these other embodiments is a warping of the downsampled area. This warping may be disconcerting, and therefore objectionable, to some viewers.

Figure 9:
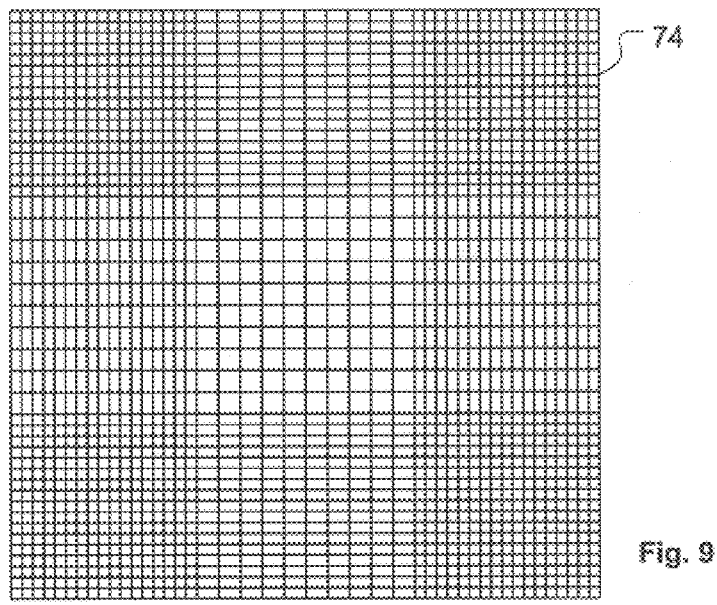
FIG. 9 depicts a second image mapping according to an embodiment of the invention.

FIG. 9 illustrates a "warping grid" 74 corresponding to one warping embodiment. Each gridded region of grid 74 represents one pixel from the original image, shown with its corresponding allotted area in the display image. Pixels in the center of grid 74 are displayed without distortion—these correspond to the desired full-size display subimage. Pixels directly to the left, right, top, or bottom of this center region are distorted (i.e., downsampled) in one dimension only, such that no discontinuity will exist at the subimage boundary. Pixels lying elsewhere in grid 74 are downsampled in both dimensions.

Figure 10:
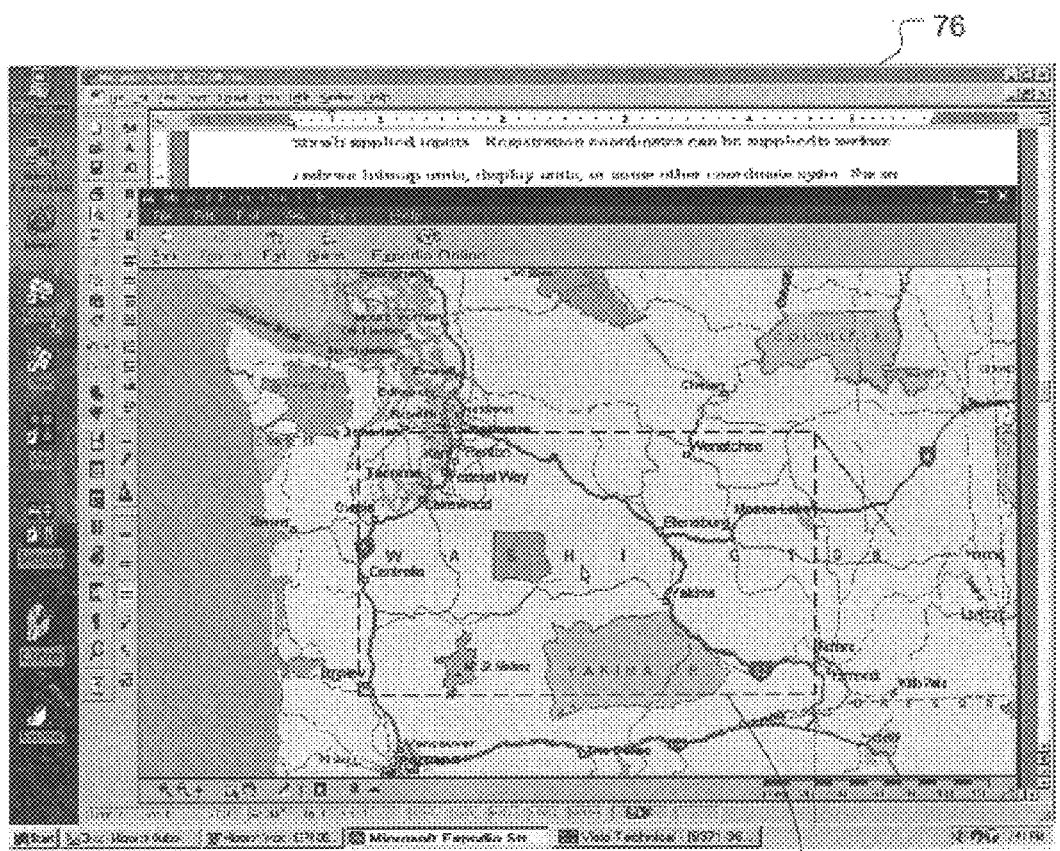
FIG. 10 shows a corresponding image after mapping according to the embodiment of FIG. 9.

FIG. 10 shows a display 76 created using a warping grid, similar to grid 74, applied to bitmap 22 of FIG. 3A. The full-size display region 78 is shown in a dashed box on display 76, although preferably, no outline would be used in this embodiment. Areas to the immediate left and right of region 78 are decimated in column only, and areas immediately above and below region 78 are decimated in row only. Corner regions are decimated in both row and column.

Figure 11:
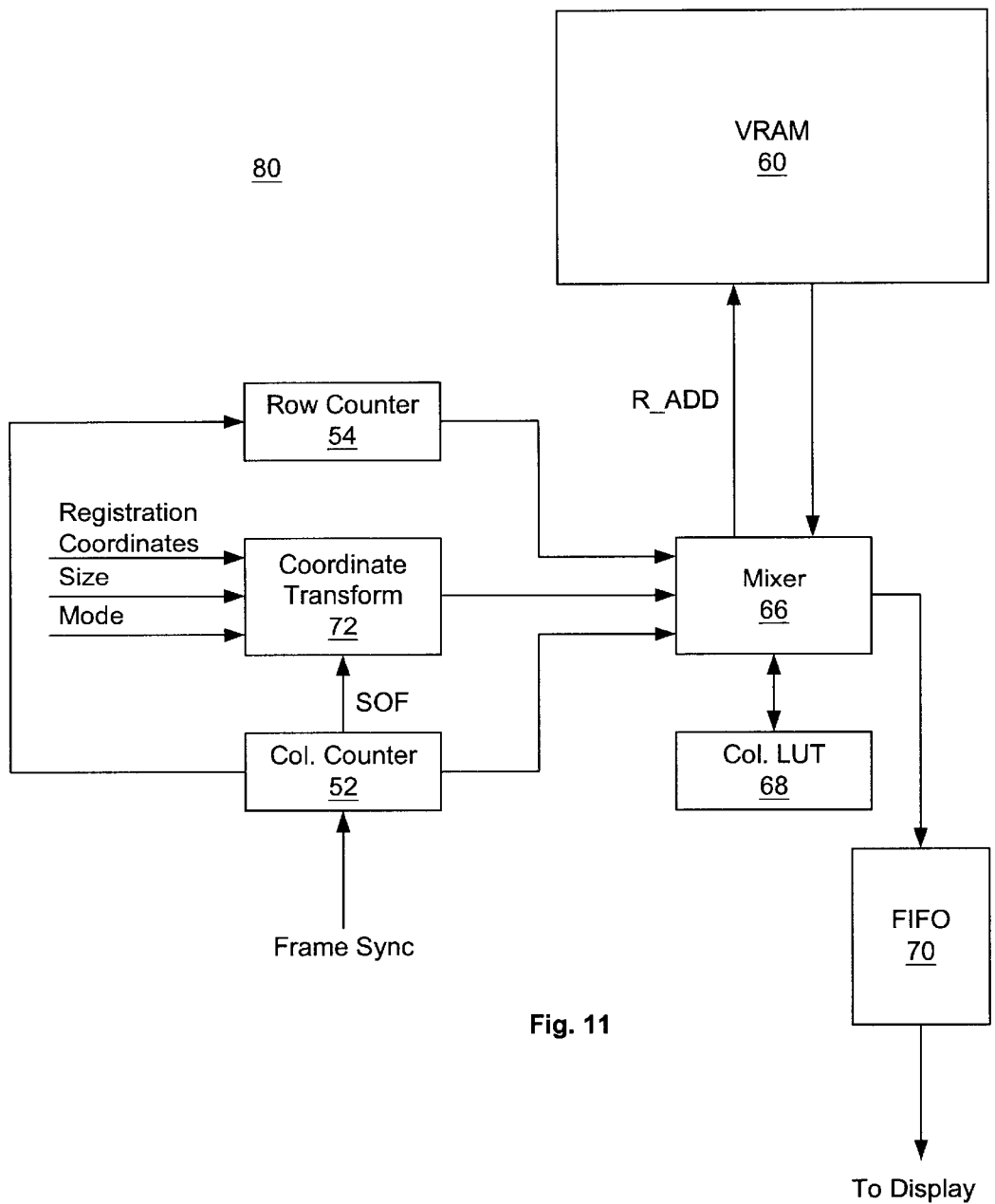
FIG. 11 depicts a block diagram of a video adapter according to a third embodiment of the invention.

FIG. 11 illustrates a block diagram of a video adapter 80 that can be used to implement such a warping embodiment. This embodiment is actually simpler than the first embodiment, since row and column mappings are independent. Thus adapter 80 requires no row buffers, and can generally gain no efficiency by using a row look-up table (the look-up table would potentially require frame-by-frame updating, and each element would only be used once per frame). The row translate functions are performed by mixer 66, which generates an address $R_{13}$ ADD for retrieving a row from VRAM 60.

The following pseudocode further illustrates the operation of this embodiment. Note that this embodiment uses the variables OrgRow, OrgCol to prevent the computed full-size subimage area from extending past the display boundaries.

```
/* for each display scan, initialize coordinates and column LUT */
OrgRow   = MIN(MAX(PointRow, SizeRow / 2), R - SizeRow / 2);
OrgCol   = MIN(MAX(PointCol, Sizecol / 2), C - SizeCol / 2);
StartRow = OrgRow - SizeRow / 2;
EndRow   = StartRow + SizeRow;
StartCol = OrgCol - SizeCol / 2;
EndCol   = StartCol + SizeCol;
OffRow   = (OrgRow - SizeRow / 2) * (M - SizeRow) / (R - SizeRow)
           + SizeRow / 2 - OrgRow;
OffCol   = (OrgCol - SizeCol / 2) * (N - SizeCol) / (C - SizeCol)
           + SizeCol / 2 - OrgCol;
for (j = 0; j < C; j++)
{
    if (j < StartCol)          /* case 1-left */
    {
       ColLut[j] = j * (N - SizeCol) / (C - SizeCol);
    }
    else if (j < EndCol)       /* case 2-center */
    {
       ColLut[j] = j + OffCol;
    }
    else                       /* case 3-right */
    {
       ColLut[j] = (j - SizeCol) * (N - SizeCol) / (C - SizeCol) + SizeCol;
    }
}
/* then fill display image */
for (i = 0; i < R; i++)
{
    /* case 1: a vertically downsampled row above subimage */
    if (i < StartRow)
    {
       Row = i * (M - SizeRow) / (R - SizeRow)
    }
    /* case 2: a row aligned with subimage*/
    else if (i < EndRow)
    {
       Row = i + OffRow;
    }
    /* case 3: a vertically downsampled row below subimage */
    else
    {
       Row = (i - SizeRow) * (M - SizeRow) / (R - SizeRow) + SizeRow;
    }
    for (j = 0; j < C; j++)
    {
       Display[i][j]= OrgBitmap[Row][ColLut[j]];
    }
}
```

Figure 12:
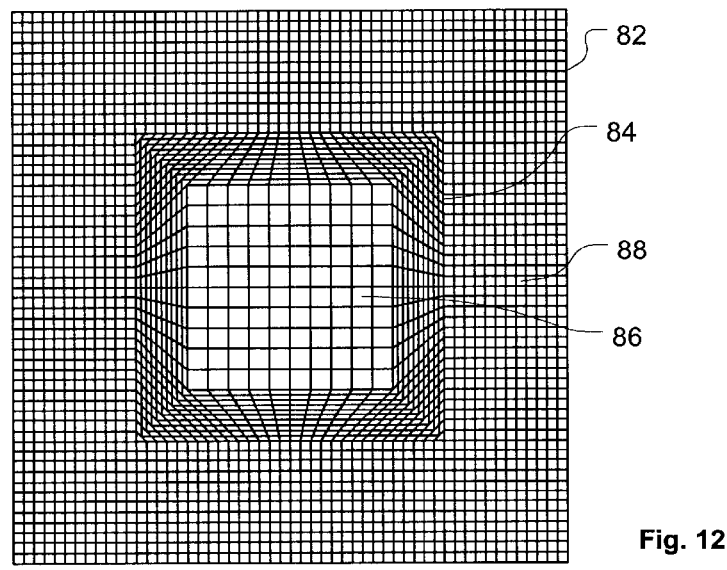
FIG. 12 depicts a third image mapping according to an embodiment of the invention.

Other warping functions may also be selected for a particular embodiment. FIG. 12 depicts a warping grid 82 that surrounds the full-size subimage area with a warp transition zone 84. Transition zone 84 is designed to avoid discontinuities at its boundaries with both the subimage area 86 and the uniformly downsampled outer area 88. Pixel mapping functions useful in implementing such a warping grid will generally require processor computations that vary from line to line within the display (or a stored two-dimensional offset LUT for region 84). Such implementations may also be difficult with conventional VRAMs that provide slow random access. If impediments such as these do not exist within a system, a warping grid similar to grid 82 is possible.

Figure 13:
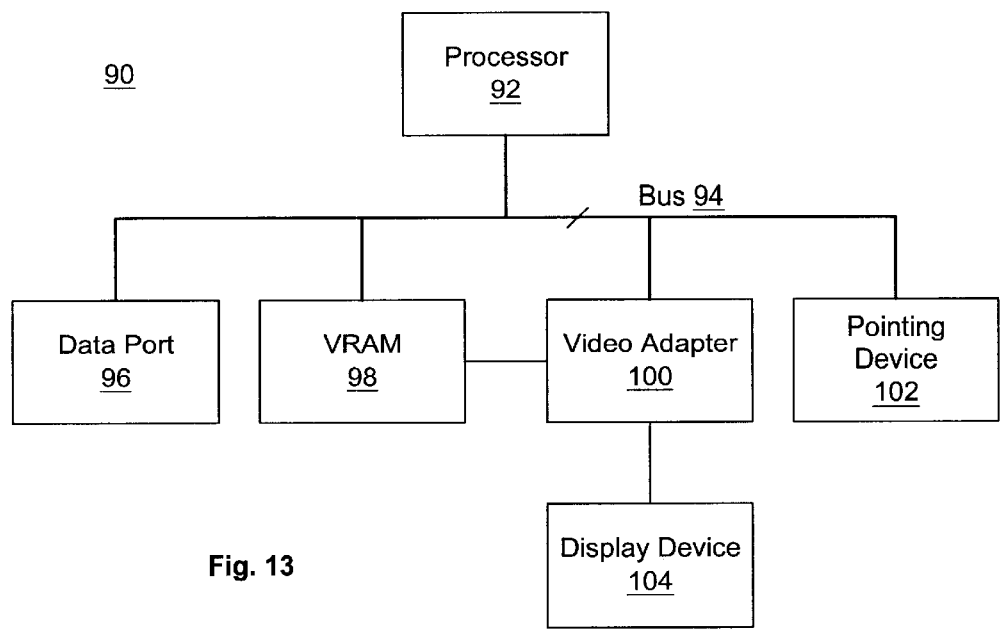
FIG. 13 illustrates a display system according to an embodiment of the invention.

FIG. 13 illustrates one way in which an embodiment of the invention can be incorporated in a display system 90. Display system 90 comprises a processor 92, a data port 96, a VRAM 98, a video adapter 100, and a pointing device 102, each connected to a common bus 94, such as a PCI bus. Other elements may also connect to this bus, and VRAM 98 and video adapter 100 may share a common connection to bus 94. Video adapter 100 can also access VRAM 98 without using bus 94. Also, video adapter 100 provides its output to a display device 104. Display system 90 may comprise, for example, a laptop computer, an unsophisticated terminal, or a fully functional desktop computer.

During operation according to this embodiment, display system 90 is configured such that a bitmap is stored in VRAM 98, using bus 94. The bitmap may originate, e.g., from processor 92, or from a remote device that connects to data port 96. Display system 90 is configured, however, such that the resolution selected for display device 104 is smaller than the resolution of the bitmap stored in VRAM 98. Video adapter 100 uses, e.g., one of the embodiments disclosed above, to convert the bitmap stored in VRAM 98 into a format compatible with the display resolution.

Video adapter 100 also receives, over bus 94, registration coordinates, mode information, and subimage size. Although peripherals such as pointing device 102 could be configured to provide some of this information directly to video adapter 100, software control using processor 92 is preferable. For instance, a video adapter driver program running on processor 92 can be used to allow a user to toggle between various display modes, some or all implementing embodiments of the invention, and to alter the subimage size. The driver program may also allow the user to select one of several available choices for providing registration coordinates—these can include active cursor or pointing device location, areas of the display exhibiting high temporal change, or even coordinates provided by a separate peripheral providing an eye tracker function. An eye tracker function may also alter subimage size based on a viewer's detected head position and a corresponding foveal vision area.

Display system 90 can provide a lower-resolution display in a process that is transparent to the producer of a higher-resolution bitmap (e.g., processor 92 or a device connected through data port 96). This may require that several coordinate systems be maintained for pointing device 102, with a translator providing translation therebetween. Generally, it is possible for the translator to reside within video adapter 100, as long as it is aware of the units being used externally for pointer position.

One of ordinary skill in the art will recognize that the concepts taught herein can be tailored to a particular application in many advantageous ways. The invention can be implemented for only a subsection of an entire display, such as a single application window. Likewise, the entire image need not be forced into the peripheral area of the display—thus, this approach could be combined, for instance, with a scrolling control function. It can also be integrated with the process that renders the original bitmap, which is some instances can allow the step of generating the original bitmap to be bypassed. Such minor modifications are encompassed within the invention, and are intended to fall within the scope of the claims.

What is claimed is:

1. A display system comprising:
    a display device having a first resolution;
    a video RAM memory having a size sufficient to store a bitmap larger than the first resolution;
    a display driver having a display mode for displaying a bitmap, larger than the first resolution and stored in the video RAM memory, on the display device, the display mode comprising displaying a subsection of the stored bitmap on a subsection of the display device, and displaying a downsampled version of the stored bitmap on areas of the display device other than the subsection of the display device, the subsection substantially registered to the downsampled version at a point on the display device.

2. The display system of claim 1, wherein in the display mode the driver responds to indications from a viewer of a new area of interest on the display by shifting the location of the displayed subsection of the stored bitmap to correspond to the new area of interest.

3. The display system of claim 1, further comprising a processor for generating bitmap data for storage in the video RAM memory.

4. The display system of claim 1, further comprising an input port for receiving bitmap data from a remote system for storage in the video RAM memory.

5. The display system of claim 1, further comprising a pointing device, and a pointing device translator for translating pointing device coordinates between the coordinate system of the display device and the coordinate system of a bitmap stored in the video RAM memory.

6. A method of generating, from a digital image having a first row and column size, a displayable image having a second row and column size, wherein the second row size is smaller than the first row size, the method comprising:
    storing the digital image in a video RAM;
    receiving an indication, from a display device user, of a point on a display device where full resolution display of the digital image is requested;
    calculating a point on the digital image that is substantially registered with the point on the display device;
    calculating a subsection of the digital image, including the calculated point, to be displayed at full resolution on the display device;
    outputting, to a subsection of the display device corresponding to the calculated subsection of the digital image, full resolution data from the portion of the video RAM corresponding to the calculated subsection of the digital image; and
    for display on areas of the display device other than the corresponding subsection, outputting data from the video RAM according to a downsampling pattern that maps the first row and column size to the second row and column size.

7. The method of claim 6, wherein outputting data from the video RAM comprises, when a display row on the display device comprises some columns within the calculated subsection and some columns outside the calculated subsection, outputting data from a first row of the video RAM corresponding to the display row for display of full resolution data to a first buffer, and outputting data from a second row of the video RAM corresponding to the display row for display outside the calculated subsection to a second buffer, and forming data for the display row by mixing full resolution data from the first buffer with downsampled data from the second buffer.

8. The method of claim 7, further comprising determining the second row of the video RAM by referencing a look-up table keyed to the display row.

9. The method of claim 7, further comprising downsampling data from the second buffer by referencing a look-up table keyed to display column.

10. The method of claim 7, further comprising low-pass filtering data from the second row of the video RAM prior to placing that data in the second buffer.

11. The method of claim 6, wherein outputting data from the video RAM comprises:
    calculating a subsection of the displayable image corresponding to the subsection of the digital image to be displayed at full resolution on the display device;
    for each display row outside of the row range of the calculated subsection of the displayable image, retrieving a row of data from the video RAM according to a downsampling pattern that maps the rows outside that row range into the rows outside the calculated subsection of the displayable image;
    for each display row inside that row range, retrieving a row of data from the video RAM corresponding to that row in the digital image; and
    for each retrieved row, outputting columns of data within the column range of the calculated subsection of the displayable image at full horizontal resolution, and outputting columns of data outside that column range according to a downsampling pattern that maps the columns outside that column range into the columns outside the calculated subsection of the displayable image.

12. The method of claim 11, wherein outputting columns of data for each retrieved row comprises referencing a look-up table keyed to display column.

13. The method of claim 6, wherein the step of calculating a point on the digital image comprises applying a hysteresis function to the indicated point for the purpose of limiting response to minor deviations in the location of the indicated point.

14. The method of claim 6, further comprising the step of calculating, based on information of the user's eye position relative to the display device, the dimensions of the subsection prior to its display.

15. The method of claim 14, wherein calculating the dimensions comprises approximating the extent of the user's foveal view projected onto the display device.

16. The method of claim 6, wherein receiving an indication comprises receiving an indication of the user's point of focus on the display device.

17. The method of claim 6, further comprising the steps of tracking the orientation of the user's eye, and estimating the user's point of focus from the tracking.

18. The method of claim 6, wherein receiving an indication comprises receiving the display coordinates of an active cursor or pointer on the display device.

19. The method of claim 6, further comprising responding dynamically to changes in the content of the video RAM and changes in the indication received from the user.

20. The method of claim 6, wherein receiving an indication comprises comparing the current digital image to past digital images, and selecting a point on the current digital image having significant temporal change from past images.

21. The method of claim 6, wherein the downsampling pattern uniformly samples the digital image.

22. The method of claim 6, wherein the downsampling pattern only vertically downsamples rows of the digital image lying outside the calculated subsection, and only horizontally downsamples columns of the digital image lying outside the calculated subsection.

23. A display driver comprising:
a video RAM for storing a digital image having a first row and column size; and
circuitry for outputting a displayable image having a second row and column size, wherein the second row size is smaller than the first row size, the circuitry comprising
at least one buffer for receiving data from a row of the video RAM, and
a mixer that retrieves data from the at least one buffer according to coordinates for a subsection of the digital image to be displayed at full resolution, the mixer selecting full resolution data from the at least one buffer for display when that data is part of the subsection, the mixer otherwise selecting downsampled data from the at least one buffer for display.

24. The display driver of claim 23, wherein the at least one buffer comprises first and second row buffers, the first buffer for receiving data from a row of the video RAM that is to be downsampled to produce a display row, the second buffer for receiving data from a row of the video RAM that contains data to be displayed at full resolution.

25. The display driver of claim 24, wherein the circuitry for outputting a digital image further comprises a column look-up table in communication with the mixer, the column look-up table containing a mapping between video RAM columns and displayable columns, the mixer using the column look-up table to downsample data from the first buffer.

26. The display driver of claim 23, wherein the circuitry for outputting a digital image further comprises:
a row counter to maintain a value for the display row; and
a row translator to translate a row value from the row counter into a corresponding video RAM row, the video RAM row indicating the location of data to be received by the at least one buffer.

27. The display driver of claim 26, wherein the circuitry for outputting a digital image further comprises a row look-up table in communication with the row translator, the row look-up table containing a mapping between video RAM columns and displayable columns, the row translator using the row look-up table to downsample rows from the video RAM.

28. The display driver of claim 23, embodied in a video adapter.

29. The display driver of claim 23, further comprising a video buffer for accepting the mixer output and supplying it to a display device.

* * * * *

UNITED STATES PATENT AND TRADEMARK OFFICE
CERTIFICATE OF CORRECTION

PATENT NO. : 6,417,867 B1
DATED : July 9, 2002
INVENTOR(S) : Hallberg

It is certified that error appears in the above-identified patent and that said Letters Patent is hereby corrected as shown below:

Column 13,
Line 16, "claim 6" should read -- claim 16 --.

Signed and Sealed this

Tenth Day of December, 2002

JAMES E. ROGAN
*Director of the United States Patent and Trademark Office*